United States Patent [19]

Nagashima

[11] Patent Number: 5,796,940
[45] Date of Patent: Aug. 18, 1998

[54] METHOD FOR EXECUTING SOFTWARE PROGRAM AND CIRCUIT FOR IMPLEMENTING THE METHOD

[75] Inventor: Takeshi Nagashima, Tokyo, Japan

[73] Assignee: Sega Enterprises, Ltd., Tokyo, Japan

[21] Appl. No.: 466,207

[22] Filed: Jun. 6, 1995

Related U.S. Application Data

[63] Continuation-in-part of Ser. No. 335,848, filed as PCT/JP94/00333 Mar. 2, 1994, abandoned.

[30] Foreign Application Priority Data

Mar. 10, 1993 [JP] Japan ................................ 5-76299

[51] Int. Cl.$^6$ .................... G06F 1/00; G06F 12/06; G06F 7/58
[52] U.S. Cl. .................................. 395/186; 395/490
[58] Field of Search ................ 395/186, 187.01, 395/188.01, 490, 491, 442, 427; 340/825.31; 380/23, 4

[56] References Cited

U.S. PATENT DOCUMENTS

| | | | |
|---|---|---|---|
| 4,442,486 | 4/1984 | Mayer | 395/186 |
| 4,462,076 | 7/1984 | Smith, III | 380/4 |
| 4,485,457 | 11/1984 | Balaska et al. | 395/405 |
| 4,525,795 | 6/1985 | Rubin | 364/721 |
| 4,799,635 | 1/1989 | Nakagawa | 380/4 X |
| 4,844,465 | 7/1989 | Hibino et al. | 273/148 B |
| 4,959,860 | 9/1990 | Watters et al. | 380/4 |
| 5,134,391 | 7/1992 | Okada | 345/116 |
| 5,155,768 | 10/1992 | Matsuhara | 380/23 |
| 5,184,830 | 2/1993 | Okada et al. | 463/29 |
| 5,369,771 | 11/1994 | Gettel | 395/750 |
| 5,395,112 | 3/1995 | Darling | 463/44 |

FOREIGN PATENT DOCUMENTS

| | | |
|---|---|---|
| 0 200 704 | 12/1986 | European Pat. Off. . |
| 0 268 419 | 5/1988 | European Pat. Off. . |
| 0378385 | 7/1990 | European Pat. Off. . |
| 0 430 843 | 6/1991 | European Pat. Off. . |
| 58-101349 | 6/1983 | Japan . |
| 1-8456 | 1/1989 | Japan . |
| 1-140253 | 6/1989 | Japan . |
| 2-210562 | 8/1990 | Japan . |
| 2-253338 | 10/1990 | Japan . |

*Primary Examiner*—Ly Hua
*Attorney, Agent, or Firm*—Rabin, Champagne & Lynt, P.C.

[57] ABSTRACT

A method for executing software which is stored in an external memory attached to console equipment having a CPU uses software assets advantageously. The console equipment is designed to bank switch from a BIOS ROM included in the console equipment to the software stored in the external memory during an initialization routine, to check the genuineness of the software during a security check routine, and to execute the software by the CPU of the console equipment during a program executing routine if the software is judged to be genuine during the security check routine. In some embodiments of the method, the program is executed by the CPU during the program executing routine after the security check routine, at least, has been skipped. In other embodiments, the security check is always forced to be successful. Circuitry for performing the method is also disclosed.

11 Claims, 12 Drawing Sheets

METHOD FOR EXECUTING SOFTWARE PROGRAM AND CIRCUIT FOR IMPLEMENTING THE METHOD

CROSS REFERENCE TO RELATED APPLICATIONS

This application claims the priority of application Ser. No. 5-76299, filed Mar. 10, 1993 in Japan. Furthermore this application is a continuation-in-part of U.S. application Ser. No. 08/335,848, filed Nov. 9, 1994 (requirements under 35 USC 371 completed on Jan. 27, 1995) on the basis of international application Ser. No. PCT/JP94/00333, filed Mar. 2, 1994. The disclosures of these prior applications are incorporated herein by reference.

BACKGROUND OF THE INVENTION

1. Field of the Invention

The present invention relates to a method for executing a software program and a circuit for performing the method. More particularly, it relates to a method for executing a software program, which method is advantageous in its use of software assets stored in external memories which are detachably connected to hardware equipment, and to a circuit for performing the method.

2. Description of the Related Art

In recent years, software programs have been supplied in various forms, for example, ROM cartridges, floppy disks and so on, for use in hardware equipment having a microcomputer.

Further, it is common to perform a security check on a software program to prevent an illegally copied/created software program from being used in the hardware equipment.

Various methods for checking the security of a software program have been proposed in, for example, U.S. Pat. No. 4,442,486 (corresponding to European Patent Application EP No. 80,244 and Japanese laid-open Patent Publication No. 101349/1983), U.S. Pat. No. 4,462,076 and U.S. Pat. No. 5,155,768 (corresponding to Japanese laid-open Patent Publication No. 266051/1991).

In the method described in U.S. Pat. No. 4,422,486, the content of a fixed address in the memory of a game cartridge, which is detachably connected to console equipment in which a CPU is provided, is compared with a security message stored in the CPU of the console equipment. As a result of this comparison, if a correspondence is not detected, the cartridge is refused. That is, the program stored in the memory of the cartridge cannot be executed.

In the method described in U.S. Pat. No. 4,462,076, when a device in which a program is installed is connected to the console equipment, a message corresponding to a signal obtained from the console equipment is indicated on a display. That is, a fixed message, for example, "This equipment uses the invention of a patent application filed on D/M/Y" or the like, is displayed. If it is different from the indication of the message, further use of the device providing the program is prohibited.

Further, in the method described in U.S. Pat. No. 5,155,768, a security circuit provided in the console equipment is initialized when the power to the console equipment is ON. A signal generated due to the initialization of the security circuit makes it possible to operate the console equipment.

Whenever the security circuit is accessed, a security code read from the game cartridge is compared with the security code generated in the console equipment. And if they do not correspond, the operation of the console equipment is stopped by a reset signal generated by the security circuit.

According to the conventional methods for checking security, users may have only software which is acceptable to the console equipment as assets. However, if the users want to buy a new version of the console equipment to replace of the console equipment they have owned until then, numerous software assets cannot be used any longer because of the security check.

In this case, the users cannot use the software assets effectively, and it is detrimental from a customer relations point of view not to be able to use the software assets.

On the other hand, forms of business have become diversified according to the large supply of software programs in recent years. One of the forms of business that is being introduced is the distribution of game software to subscribers and registered users via transmission channels, for example, cable television and the like.

In this case, one need not consider the possibility that software programs which have not been licensed by a software supply company might be distributed, that is, that software which is copied or created illegally might be distributed to the users through a transmission channel. This is because a license contract has generally been made between the software supply company and the distributor.

Accordingly, there is no need to include a security check code or the like in the software program which is distributed. Because of that, if software which does not include the security check code or the like is distributed, the users can reduce the time required for down-loading the software program distributed to their own equipment.

Further, it takes much time to perform the security check every time the distributed software is executed, although the software is genuine. And it would therefore be desirable to solve this troublesome annoyance.

Although the console equipment of a game machine may be dedicated exclusively for use with software distributed via a cable television transmission channel or the like, it is preferable that the equipment can be also used with a software program installed in the memory of a cartridge or the like that the user has bought individually.

However, in this case, the console equipment of the game machine is required to have the security check function. Therefore, software distributed via a cable television transmission channel or the like cannot be executed because it has no security check code to be checked by the security check function of the equipment.

SUMMARY OF THE INVENTION

It is therefore an object of the present invention to provide a method for relaxing the security check function to solve the inconvenience problem and for permitting software assets to be used effectively, and to provide equipment for performing the method.

It is another object of the present invention to provide a method by which the security check function of the console equipment of a game machine is substantially stopped, and therefore software programs distributed without the security code or the like can be executed by the game machine, and to provide equipment for applying the method.

More particularly, it is a further object of the present invention to provide a method for executing a software program installed in console equipment that uses the security check method described in the above-described U.S. Pat. Nos. 4,462,076 and 5,155,768.

It is still a further object of the present invention to provide a method for executing a software program on console equipment which is designed to provide an initializing routine (X) for initializing the console equipment for executing the software program, a security check routine (Y) for checking the genuineness of the software program and a program executing routine (Z) for executing the software program by a CPU of the console equipment if the software program is judged to be genuine in the security check routine (Y), wherein the security check routine (Y) is bypassed by resetting the operation of the CPU at the end of the initializing routine (X) and executing the program executing routine (Z).

It is yet a further object of the present invention to provide circuit equipment for executing the above method of the present invention.

Further objects of the present invention will become apparent from the following explanation.

BRIEF EXPLANATION OF THE DRAWINGS

The attached drawings have been prepared to facilitate understanding of the present invention, and their object is to explain the present invention, entirely, and therefore, the present invention is not limited to the circuitry illustrated in the attached drawings.

DETAILED DESCRIPTION OF THE PREFERRED EMBODIMENTS

Figure 1:
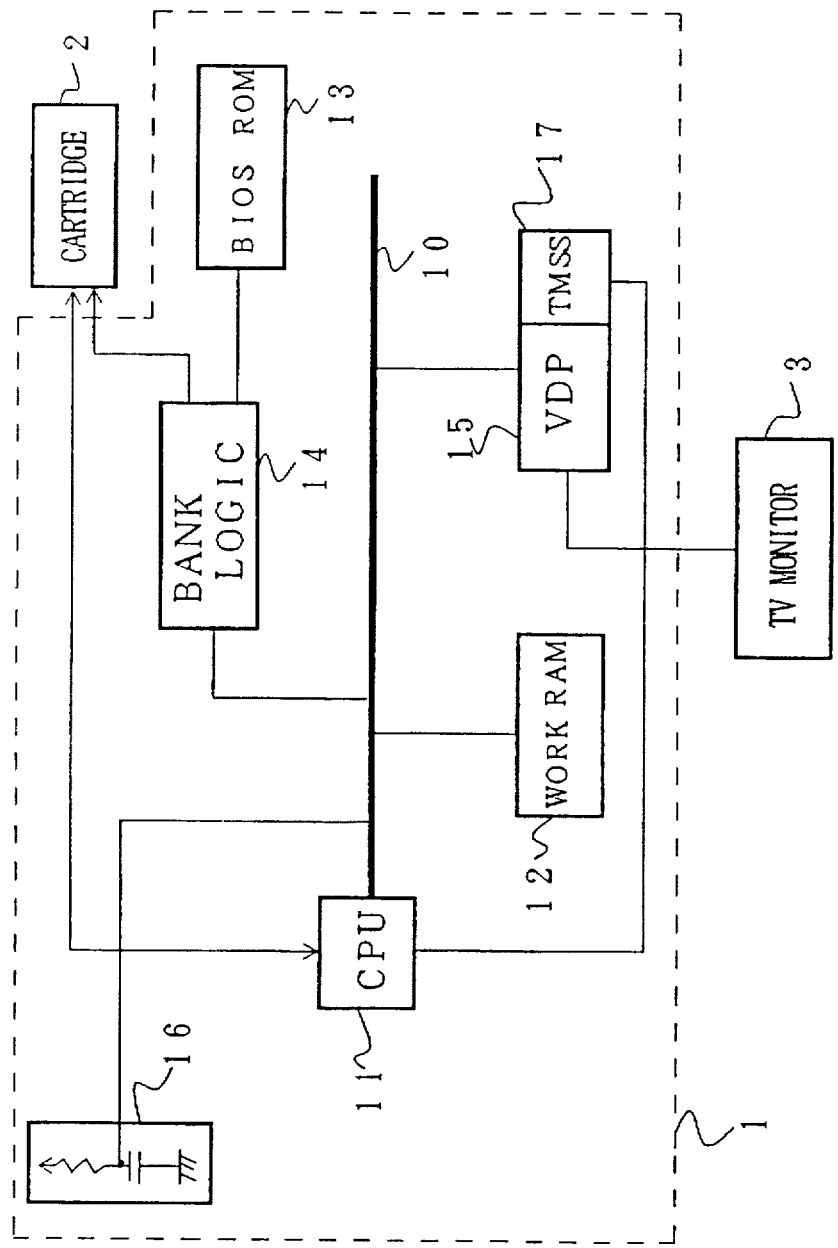
FIG. 1 is a block diagram of the console equipment of a game machine applying a method according to the present invention.
Figure 2:
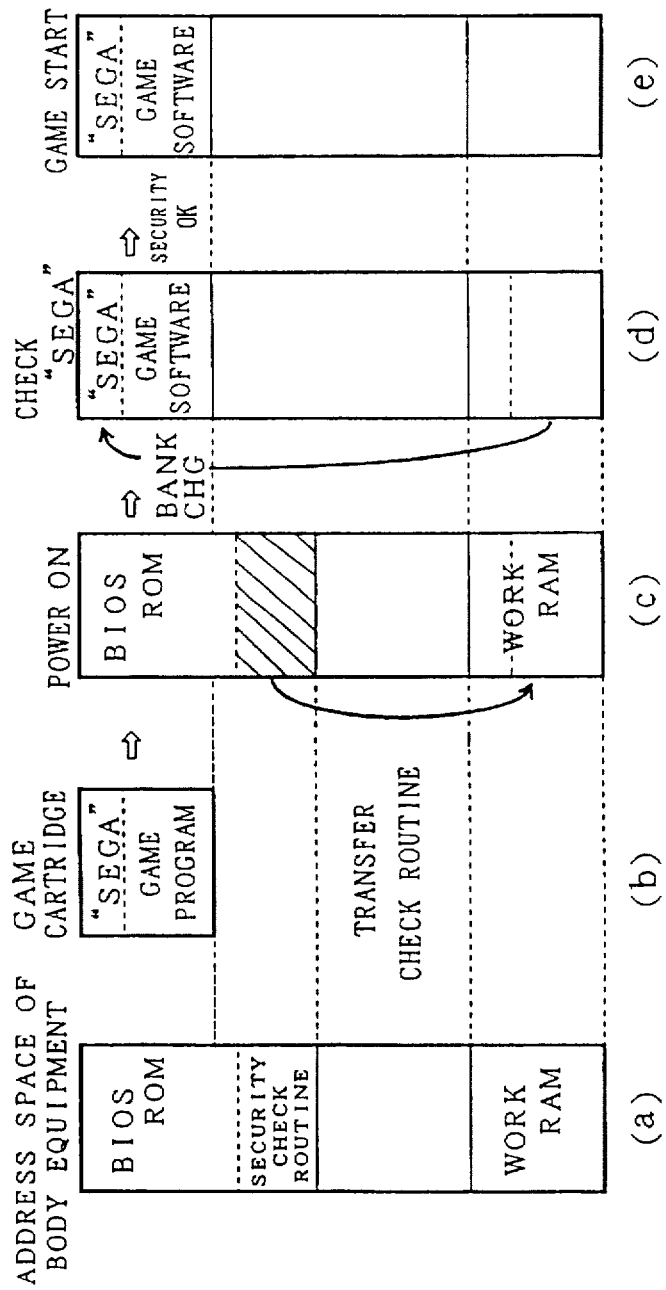
FIG. 2 is a diagram showing one example of the address space of the console equipment of the game machine employing the present invention.

FIG. 1 is a block diagram showing an embodiment of console equipment of a game machine applying a method according to the present invention. FIG. 2 shows one example of the address space of the console equipment of the game machine.

Figure 3:
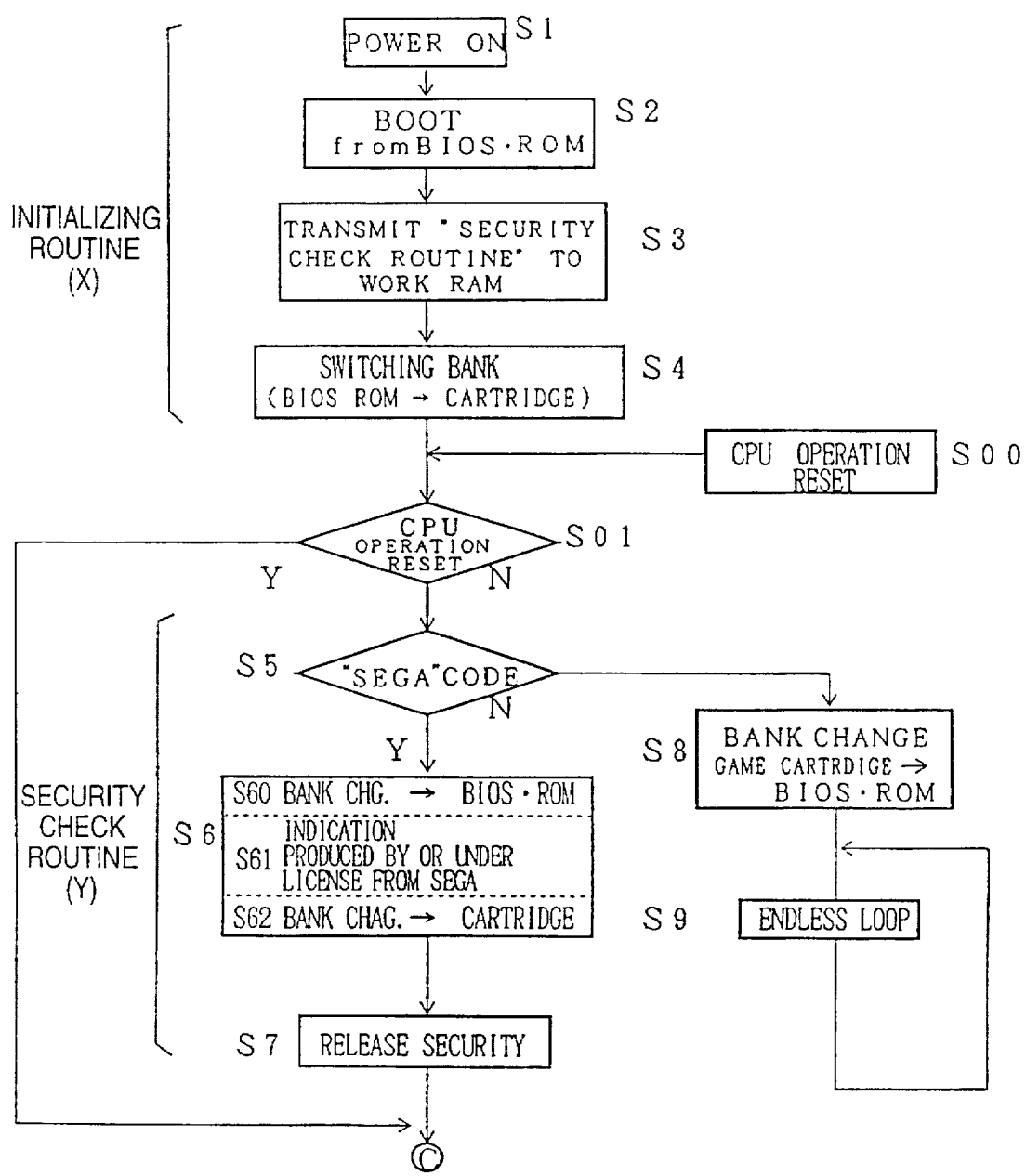
FIG. 3 is an operational flow chart (an initializing routine and a security check routine) of a method according to the present invention.
Figure 4:
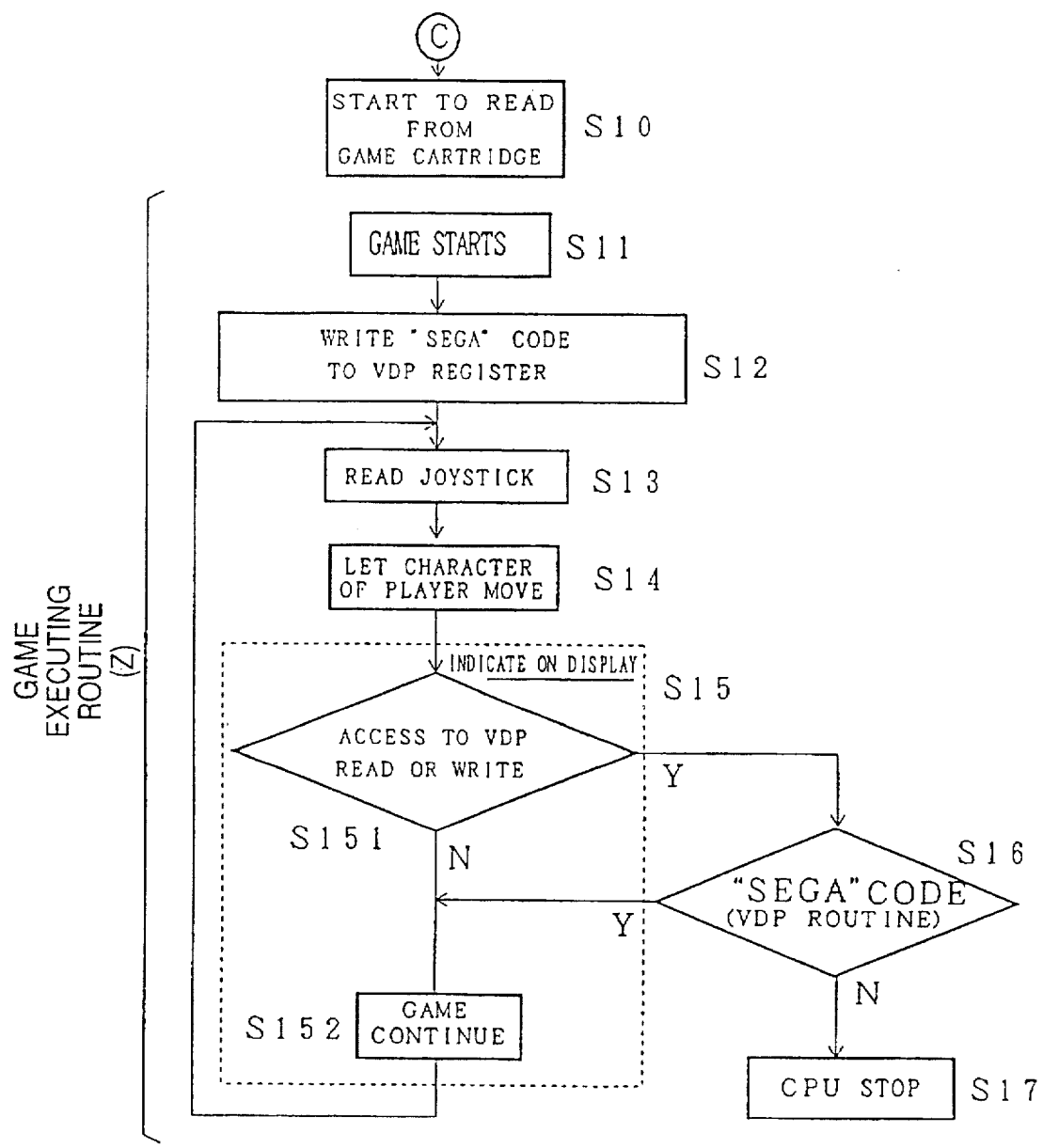
FIG. 4 is an operational flow chart (a game executing routine) of a method according to the present invention.

Further, FIG. 3 is an operational flow chart (an initializing routine and a security check routine) of a method of the present invention, and FIG. 4 is an operational flow chart (a game executing routine) of the method of the present invention.

In FIG. 1, reference numeral "1" designates the console equipment of the game machine which is used for executing software. A cartridge 2 is a program storage medium having a ROM or the like that stores software.

Furthermore, a joint adaptor (not shown in the diagram) may be connected instead of the cartridge 2, if game software or the like is distributed via a channel of CATV or the like to the console equipment of the game machine 1. The joint adaptor comprises a memory for storing software distributed via the CATV channel or the like.

When cartridge 2 is properly installed on the console equipment 1, the software stored in a ROM or the like in the cartridge 2 is read out and is executed after fixed procedures have been finished.

The software is executed by displaying image data on a TV monitor 3, if necessary. Although the present invention is not limited with respect to the kind of software, the console equipment 1 will be explained as the console equipment of a game machine for executing game software as a typical example.

An input device, such as a joy stick, a control pad or the like, not shown in FIG. 1, is attached to the console equipment of the game machine 1. The input device supplies control information, for example, for shifting a cursor according to the nature of the game displayed on the TV monitor 3.

In the console equipment of the game machine 1, various kinds of circuit components are connected to a bus 10. That is, CPU 11, a random access memory 12 for storing work (WORK RAM), a bank logic circuitry for bank switching between a read-only memory 13 for storing BIOS (Basic I/O System software) or the like (BIOS ROM) and a ROM or the like in the cartridge 2 for storing the program (hereinafter referred to as the game ROM), a video display processor (VDP) 15, and a reset logic circuit 16 for resetting the console equipment of the game machine 1 and so on are joined to the bus 10.

FIG. 2 shows the address space of the memory of the console equipment of the game machine 1 controlled by the CPU 11, and will be used to help explain the method of the present invention. That means, it shows the address space of WORK RAM 12 and the address space of the BIOS ROM 13 in (a) of FIG. 2.

Further, an area for storing the program for a security check routine to check the security as described later is maintained in the address area of the BIOS ROM 13. And an area located between the address space of the BIOS ROM 13 and that of the WORK RAM 12 is used by the VDP 15 and the like for displaying an image on the TV monitor 3.

Furthermore, the address space for the game ROM provided in the game cartridge 2 is the same as a portion of the address space of the BIOS ROM 13, and they are selected exclusively by the bank logic circuit 14 |refer to (b) of FIG. 2|. That is, the bank logic circuit 14 selects either the game ROM or BIOS ROM 13 for activation, and the other is deactivated. Bank logic circuit 14 will be discussed in more detail later with reference to FIG. 10.

The operation including the security check function in the console equipment of the game machine 1 will now be explained according to the operational flow chart shown in FIGS. 3 and 4, as follows.

|INITIALIZING ROUTINE (X)|

At first, the power of the console equipment of the game machine 1 is turned ON with a switch, not shown in the diagram (STEP S1). Next, the BIOS software of the BIOS ROM 13 is started under the control of CPU 11 (STEP S2).

The initialization of each part is performed by the BIOS, and the program of the security check routine (Y) stored in the BIOS ROM 13 is transferred to the WORK RAM 12 |refer to (c) of FIG. 2| (STEP S3).

The bank logic circuit 14 then performs bank switching form the address space of the BIOS ROM 13 to the address space of the game ROM stored in the game cartridge 2 |refer to (d) of FIG. 2| (STEP S4).

Further, the VDP 15 (see FIG. 1), which controls the image displayed on the TV monitor 3, includes a control system (TMSS 17) for a security system. TMSS 17 has a register as a constituting component. The address area of this register is located outside the address space of the BIOS ROM 13 and the address space of WORK RAM 12, which are subject to bank switching in (c) and (d) of FIG. 2.

During the initializing routine (X), a fixed security code, for example, "SEGA", is written to the register of TMSS 17 when the CPU 11 accesses the VDP 15 for the first time.

|SECURITY CHECK ROUTINE (Y)|

Next, a security check routine (Y) is executed according to the conventional method and apparatus. In this security check routine (Y), the program for the security check routine stored in the BIOS ROM 13, which has been transferred to the WORK RAM 12 as shown in (c) of FIG. 2, is executed.

This program to be executed is the same as the security check according to the above-described U.S. Pat. No. 4,462,076. After this check routine is executed, the fixed security code "SEGA" written in the register of TMSS 17 when the CPU 11 accessed the VDP 15 for the first time is eliminated.

As described above, the bank logic circuit 14 has bank switched from the BIOS ROM 13 to the ROM address of the game cartridge 2. Therefore, the ROM of the game cartridge 2 is accessed by the security check routine program transferred to and stored in the WORK RAM 12 [refer to the arrow shown in (d) of FIG. 2].

Accordingly, the security code stored in the ROM of the game cartridge 2 is read out, and the content stored in the ROM is compared with the security code "SEGA", which is a genuineness code (STEP S5).

If the fixed security code "SEGA" corresponds to the code stored in the ROM of the game cartridge 2, ("Y" at STEP S5), the program proceeds to STEP S6. This step includes three sub-steps, designated S60, S61, and S62. In sub-step S60, bank logic circuit 14 causes a bank change from the game cartridge 2 back to the BIOS ROM 13. A message or indication "PRODUCED BY OR UNDER LICENSE FROM SEGA" or the like is then displayed on the TV monitor 3 via the VDP 15 during sub-step S61 to indicate the genuineness of game cartridge 2. After this message has been displayed, bank logic circuit 14 causes a bank change from BIOS ROM 13 back to game cartridge 2 again in sub-step S62. Then the flow of the security check is released (STEP S7), and the game can be executed, so that the control is transferred to the game executing routine (Z).

Meanwhile, if the security code stored in the ROM of the cartridge 2 does not correspond to the security code "SEGA" at the STEP S5, that is, if the game cartridge is not genuine, bank switching is also performed (STEP S8). That is, the address space of the ROM of the game cartridge 2 is replaced by the address space of the BIOS ROM 13.

Therefore, the program of the BIOS enters an endless loop (STEP S9), so that the CPU 11 becomes hung up, thus prohibiting the execution of the game.

|GAME EXECUTING ROUTINE (Z)|

FIG. 4 is a flow chart for executing the game. When the program is released from the security check routine (STEP S7), the game program stored in the ROM of the game cartridge 2 is read from a start address (STEP S10), and the game is started |refer to (e) of FIG. 2|(STEP S11).

An instruction for storing the fixed code "SEGA" in the register of the TMSS 17 (for example, at the address $A14000) is included in the ROM of the game cartridge 2 in addition to the game program. According to this instruction, the fixed code "SEGA" is written to the appropriate address (STEP S12).

After that, the main sequence of the game program is executed. The main sequence has processing steps, for example, reading the state of a joy stick operated by the operator (STEP S13), processing the data to move the character of a player in accordance with the state (STEP S14), and indicating this on the display (STEP S15).

Hereupon, the TMSS 17 always compares the code written in the register of the TMSS 17 with the genuine code "SEGA". If an incorrect code is written, the operation of the CPU 11 is stopped when it accesses the VDP 15. The operation of TMSS 17 is performed independently of the operation of the CPU 11.

That is, in the case where the VDP 15 is not accessed ("N" at sub-step S151 of STEP S15), the game is continued as it is (sub-step S152). On the other hand, in the case where the VDP 15 is accessed ("Y" at sub-step S151), a comparison is performed by TMSS 17 to determine whether or not "SEGA" is stored at the fixed address (the above-described address $A14000) of the register in TMSS 17. If "SEGA" is not stored ("N" at STEP S16), the operation of the CPU 11 is stopped so as to stop the progression of the game (STEP S17). If "SEGA" is stored, the game can be continued as it is (STEP S152).

As explained above, in a conventional method the execution of the game is permitted via the security check routine (Y). To permit the game to be executed, the code for the security check, for example "SEGA", should be provided in the program stored in the ROM of the cartridge 2.

Further, in the game executing routine (Z), the instruction "Access the VDP 15 and write the code 'SEGA' in the VDP 15" must be included in the program data to check the genuineness of the program, in order for the game to be continued.

The case may occur where a code other than "SEGA" is used as a security check code in a new or updated version of the console equipment of the game machine.

Further, as described above, when software which is genuine is distributed via a CATV transmission channel or the like, there is no need to include a security check code in the program.

In this case, the game cannot be executed on the above-described conventional equipment.

Accordingly, there is a problem, since old game cartridges cannot be used effectively as assets and become an economical loss. Further, the conventional equipment is unable to accept the new service and receive software distributed via a CATV transmission channel or the like. It is therefore an object of the present invention to solve this problem.

|THE EXECUTION OF THE GAME ACCORDING TO THE PRESENT INVENTION|

First Embodiment of the Present Invention

The operation of the CPU 11 is reset when the initializing routine (X) is finished, to solve this problem (STEP S00) [refer to FIG. 3].

To perform the method of the present invention, the step of resetting the CPU 11 (STEP S00) is inserted in the flow chart as shown in FIG. 3. As explained above referring to FIG. 3, the BIOS ROM 13 is bank selected in place of the game cartridge 2 (STEP S4) during the initializing routine (X). Further, the security code stored in the ROM of the game cartridge 2 is read during the security check routine (Y), and the contents stored in the ROM of the cartridge 12 are compared with the genuine "SEGA" code (STEP S5). If the contents do not correspond to the genuine code, bank switching from the game cartridge 2 bank to the BIOS ROM 13 is performed (STEP S8). The step of resetting the CPU 11 (STEP S00) may be performed while the game cartridge 2 is bank selected, that is, before STEP 8 has been completed.

When it is detected that the step of resetting the CPU 11 (STEP S00) has been performed ("Y" at STEP S01), the CPU 11 starts to read the program from the game cartridge 2 immediately (STEP S10).

Accordingly, in the case where an operation for resetting the CPU 11 (STEP S00) is inserted, the CPU 11 detects the reset, is released from the security check routine (Y), and can enter to the game execution routine (Z) immediately.

Figure 5:
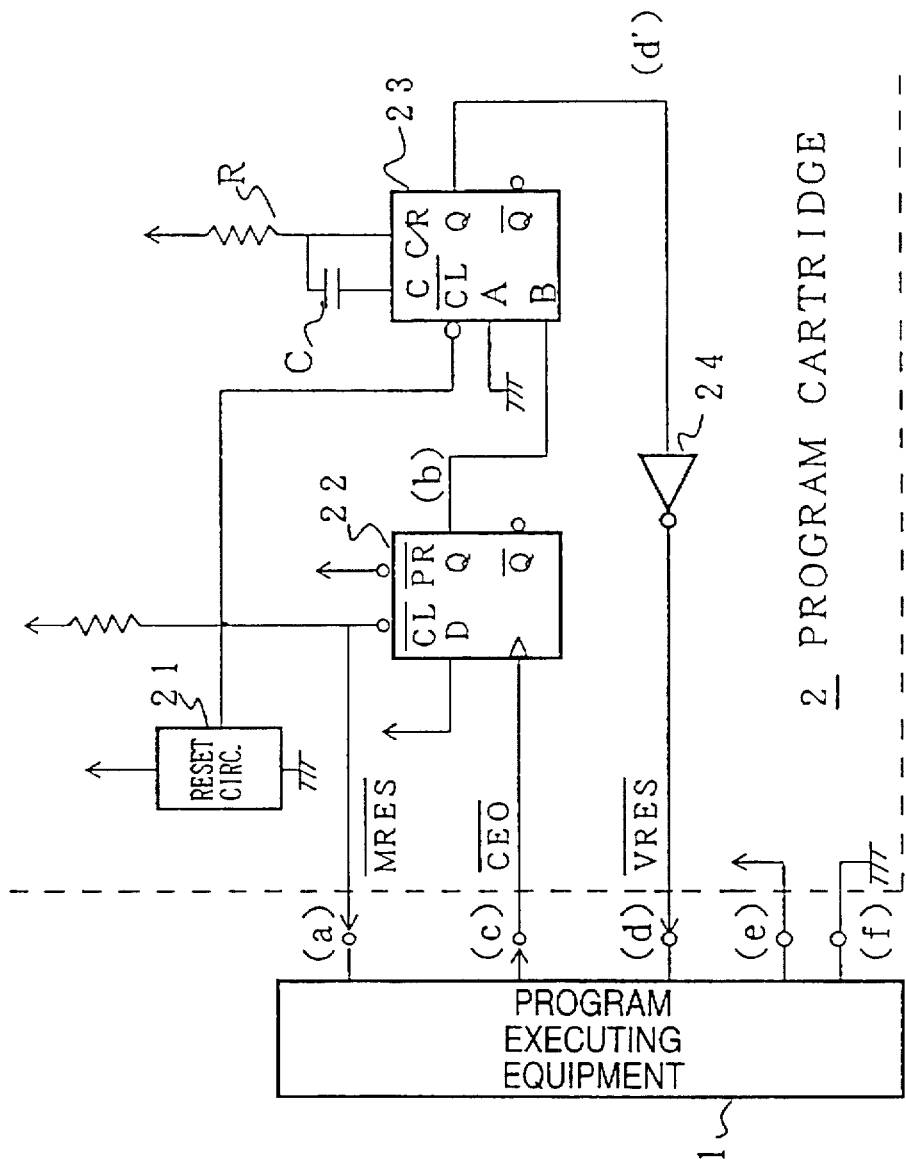
FIG. 5 is a circuit diagram showing a first embodiment applying a method according to the present invention.

FIG. 5 shows a circuit for realizing the first embodiment according to the present invention. FIGS. 6A–6E represent an operational time chart corresponding to the circuit shown in FIG. 5.

In FIG. 5, reference numeral "1" designates program execution equipment, that is, the console equipment of the game machine 1 shown in FIG. 1. The circuit marked by the broken line is an embodiment for applying the method of the present invention. The circuit of this embodiment need not necessarily be provided on the cartridge 2, but may be employed as an independent circuit.

FIGS. 6A through 6D correspond to signals at points (a) through (d) respectively in FIG. 5. Further, (e) and (f) shown in FIG. 5 designate a power source and a ground terminal, respectively. FIG. 6E corresponds to a signal at point (d') in FIG. 5.

Figure 6:
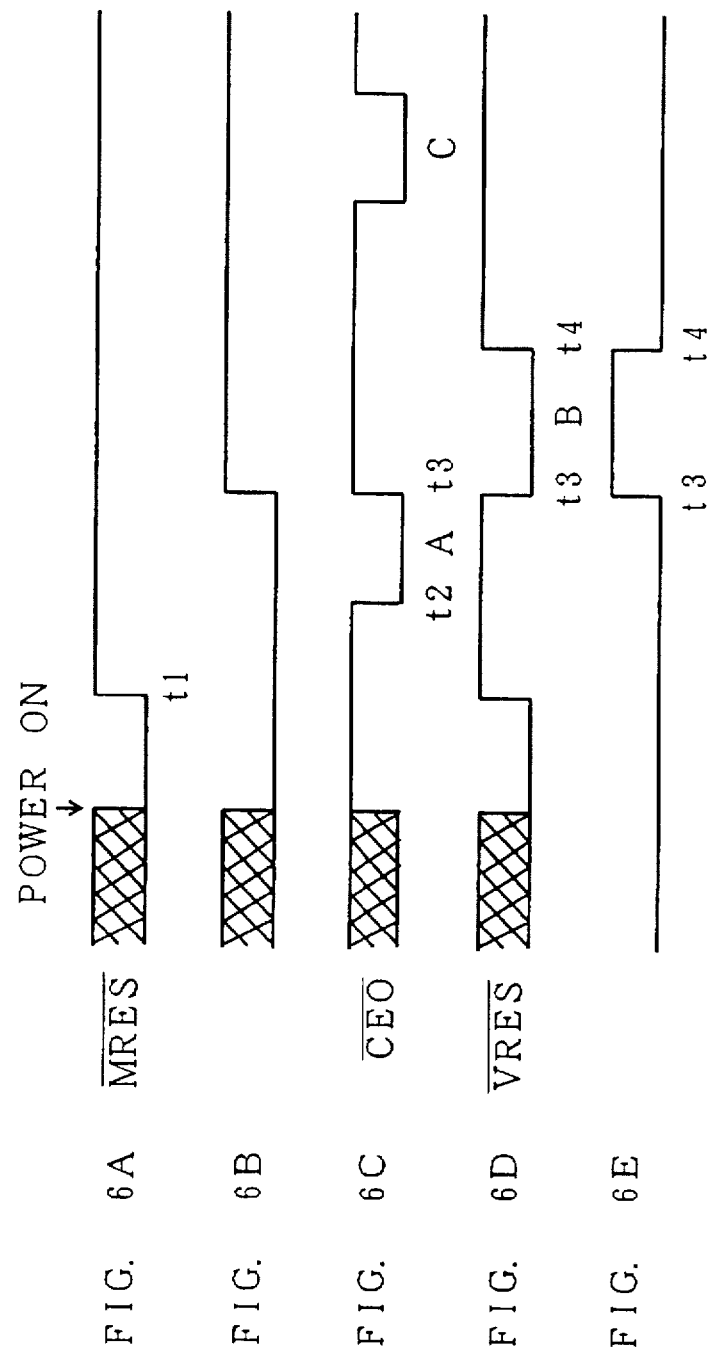
FIGS. 6A–6E represent an operational time chart of the circuit of the embodiment shown in FIG. 5.

When a power switch, not shown in the diagram, of the console equipment of the game machine 1 is turned ON [refer to FIG. 6A], a system reset signal (/MRES: active low) which is output by a reset circuit 21 continues to be at a low level for a constant interval. It changes to a high level at a time t1, and is inputted to the terminal (a) of the console equipment of the game machine 1, which is the program execution equipment, to release the CPU 11 from its reset state. The reset signal /MRES is also supplied to a clear terminal /CL of a latch circuit 22 constituted of a D flip-flop or the like.

The reset circuit 21, which is a kind of timer circuit, is provided to remove the unsettled interval until the voltage rises after the power of the console equipment of the game machine 1 is supplied, and to control the timing of the entire system.

A chip enable signal (/CEO: active low) is outputted from the terminal (c) of the console equipment of the game machine 1. The chip enable signal /CEO changes from high to low at a time t2 after the reset signal /MRES becomes high [refer to FIG. 6C]. And then, during an interval A (the period of time from t2 to t3), the CPU 11 accesses the ROM of the cartridge 2 for the first time.

Furthermore, the processing for the initializing routine X (refer to FIG. 3), including bank switching from the BIOS ROM to the cartridge 2 [(b) and (c) shown in FIG. 2], are also performed by the CPU 11 during the interval A.

Then, when the chip enable signal /CEO rises at time t3, the Q output of the latch circuit 22 also becomes high [refer to FIG. 6B]. The Q output is inputted to a reset pulse occurrence circuit 23. The reset pulse occurrence circuit 23 is a one-shot timer which outputs a signal having a fixed pulse width, the pulse width being determined by a resistor R and a capacitor C. Accordingly, since the Q output of the latch circuit 22 rises at time t3, the reset pulse occurrence circuit 23 outputs a signal having a pulse width up to a time t4.

The output of reset pulse occurrence circuit 23 is connected to the input of an open-collector inverter 24. The output of inverter 24 is actively driven to a low level when the input to inverter 24 is at a high level, but when the input is at a low level the output of inverter 24 has a high impedance state. Although not shown, the program executing equipment (console equipment 1) includes a pull-up resistor which is connected to terminal (d) and circuitry for forcing the voltage at terminal (d) to a low level until the system reset signal /MRES becomes high at time t1. Since the output of inverter 24 has a high impedance except during a reset interval B between times t3 and t4, inverter 24 does not influence the voltage at terminal (d) except during the reset interval B. However, when the output of circuit 23 is at a high level between times t3 and t4, the high level is reversed by inverter 24 to provide a CPU reset signal /VRES as shown in FIG. 6D.

This CPU reset signal /VRES changes from low level to high level at the time t4, and the CPU 11 is reset by the reset signal VRES introduced via the terminal (d). The STEP S00 is thereby performed (see FIG. 3), so that the security check routine (Y) is bypassed and the security is released (STEP S7), as described above. Accordingly, the game can be started (STEP S10).

Then, the system reset signal /MRES is at a high level and the CPU reset signal /VRES is also at a high level, so that the CPU 11 can read [refer to internal C shown in FIG. 6C] and execute the game program by accessing the ROM of the cartridge 2.

The game program is started without performing the security check routine (Y) according to the additional circuit applying the first embodiment of the present invention, as described above. Accordingly, the game can be executed, even if the fixed security code does not exist in the ROM of the game cartridge 2 or the distributed game software program.

Further, the security check routine (Y) explained in FIG. 3 is omitted, so that the fixed code "SEGA" written in the register of the TMSS 17 when the CPU 11 accesses the VDP 15 during the initializing routine (X) is saved, as it is, without eliminating it.

Accordingly, the fixed code "SEGA" is retained and therefore, even if there is no instruction to "Store the fixed code SEGA in the register of VDP 15" in the ROM of the cartridge 2 to check the genuineness of the program during playing of the game, the game can be continued during the game executing routine (Z) shown in FIG. 4, without stopping the operation of the CPU 11, because the result of the comparison of the code by the TMSS 17 always indicates genuineness.

Second Embodiment of the Present Invention

The second embodiment has a feature for stopping the operation of the CPU 11 during the time that the initializing routine (X) by the BIOS ROM 13 (refer to FIG. 3) would otherwise be executed.

Accordingly, in the second embodiment, the bank switching function performed by software processing of the CPU 11 in the first embodiment is replaced by hardware processing so as to bank switch to the cartridge 2 before the CPU 11 is reset. Therefore, when the CPU 11 is reset, it can access the cartridge 2 immediately, so that the game can be executed by bypassing the security check routine (Y) performed by the BIOS ROM 13.

Figure 7:
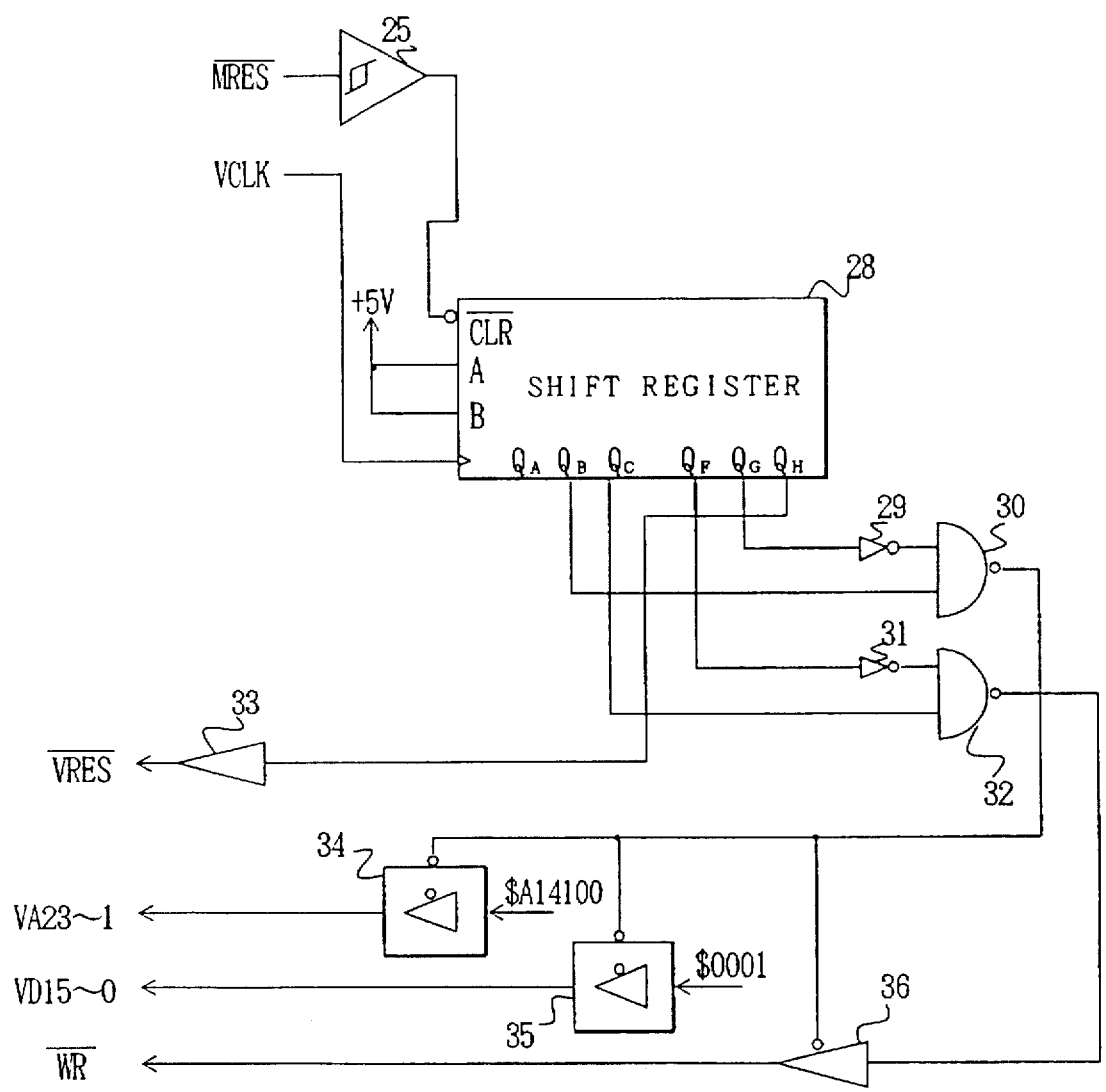
FIG. 7 is a circuit diagram showing a second embodiment applying a method according to the present invention.

FIG. 7 is a circuit of the second embodiment according to the present invention. This circuit can be provided in the cartridge 2 or as a separate circuit.

Figure 8:
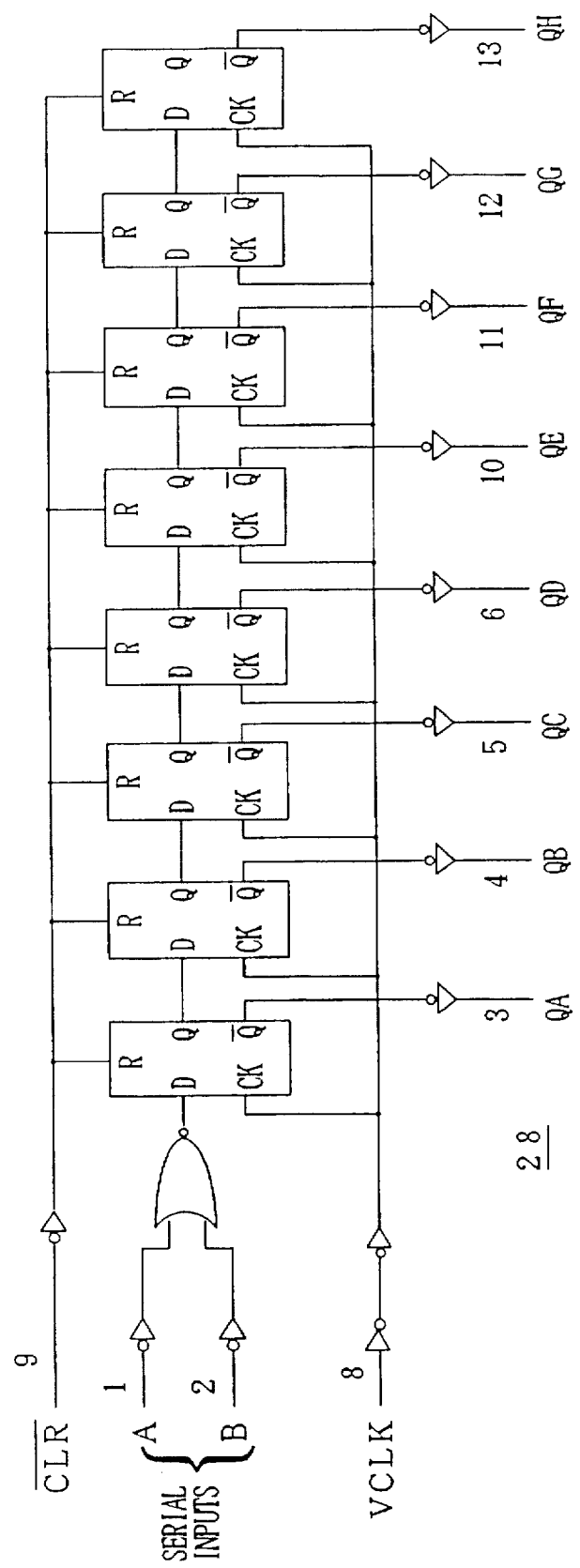
FIG. 8 is a circuit diagram showing a structural example of the counter 28 shown in FIG. 7.

Further, FIG. 8 is a diagram showing a structural example of a shift register 28 in the circuit of FIG. 7. FIGS. 9A–9G represent an operational time chart.

Figure 9:
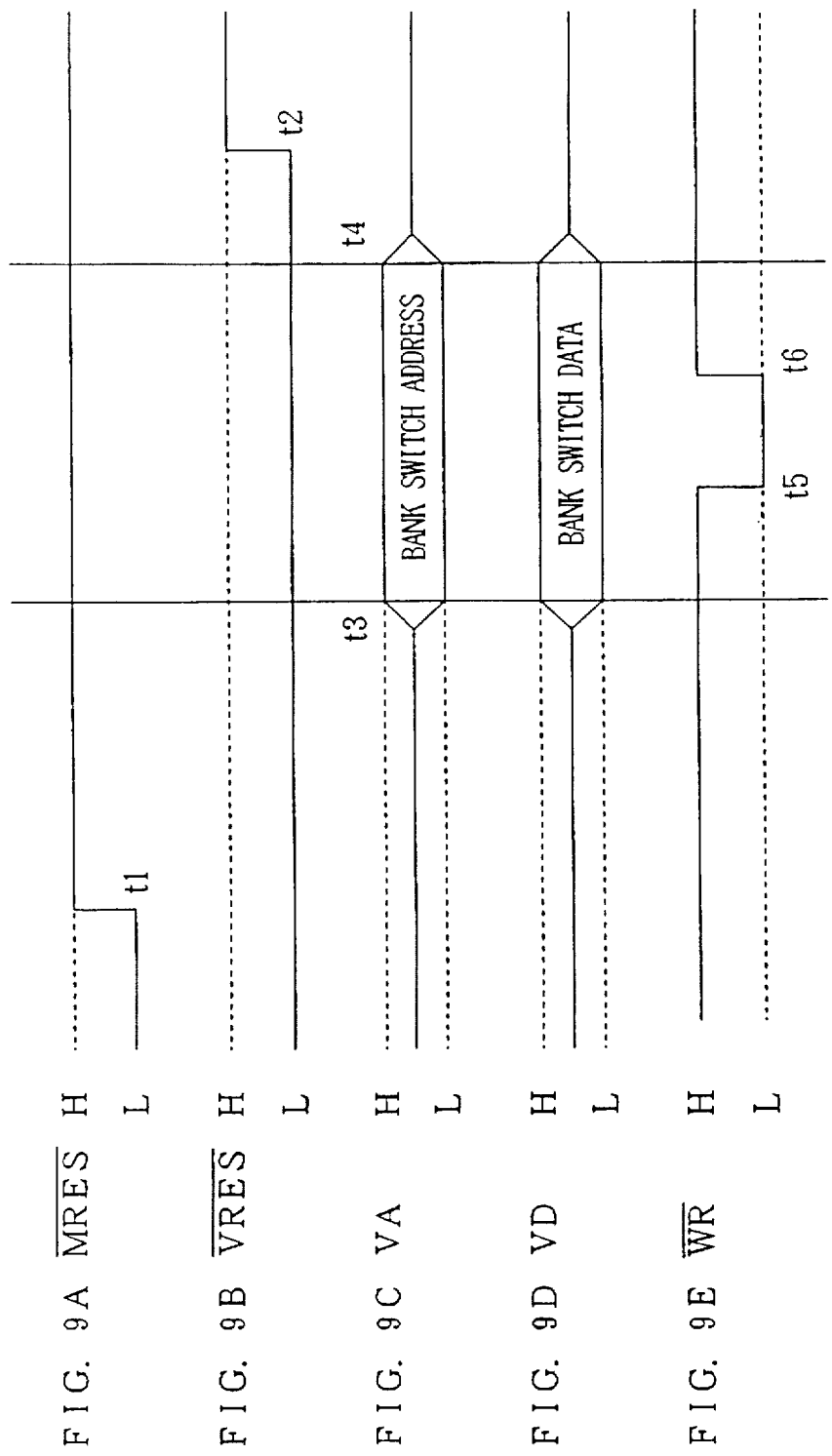
FIGS. 9A–9E represent an operational time chart of the circuit of the embodiment shown in FIG. 7.

When the power switch, not shown in the diagram, of the console equipment of the game machine 1 is turned ON, in FIG. 7, a system reset signal of the console equipment /MRES [refer to FIG. 9A] is inputted to a Schmitt trigger circuit 25. The output of the Schmitt trigger circuit 25 becomes high at a time t1 after the settling interval, and is inputted to the clear terminal /CLR of the shift register 28.

Here, the Schmitt trigger circuit 25 is provided to eliminate the unsettled interval while the voltage rises after the power of the console equipment of the game machine 1 is turned ON, and it functions the same as the reset circuit 21 shown in FIG. 5.

A clock signal VCLK from the console equipment of the game machine 1 is inputted to the shift register 28. The shift register 28 includes eight stages of D flip-flops, as shown in FIG. 8. The count value in the shift register 28 is reset by the output of the Schmitt trigger circuit 25, that is, the reset signal of the console equipment /MRES, at the time t1 shown in FIG. 9A. And then, it is incremented by the clock signal VCLK.

Further, after the outputs QB, QC, QF, and QG of the shift register 28 are logically processed by inverters 29 and 31 and by NAND gates 30 and 32, a CPU reset signal /VRES emitted by the output QH goes high at a time t2[FIG. 9B]. Bank switch address bits are represented by VA 23 through VA 1, and bank data bits are represented by VD 15 through VD 0. A write timing signal /WR is shown in FIG. 9E.

That is, the CPU reset signal /VRES is outputted when the shift register 28 counts the maximum value, and is sent to the console equipment side of the game machine 1 via an open-collector buffer 33. That means the CPU reset signal /VRES is kept at a low level up to the time t2 and becomes high at the time t2. Accordingly, the game program stored in the ROM of the cartridge 2 is not accessed by the CPU 11, up to the time t2.

On the other hand, tristate buffer arrays 34 and 35 are controlled by NAND gate 30 so as to output the bank switch address bits VA 23 through VA 1 and the bank data bits VD 15 through VD 0 during the interval from t3 to t4. Further, these tristate buffer arrays 34 and 35 can be replaced by gate components, such as open collector components, open drain components or the like.

The bank switch address bits VA 23 through VA 1 from the tristate buffer array 34 specify $A14100, which is an address for bank switching and which is given to the input side constantly. Further, the bank data bits from the tristate buffer array 35 specify $0001, which is given to the input side constantly in the same way. $0001 is bank data which causes bank switching to the cartridge 2.

Furthermore, the write timing signal /WR [FIG. 9E] is outputted from gate 36 within the period of time from t5 to t6. This write timing signal /WR is conveyed to the console equipment of the game machine 1. It is usually at a high level, and writing is permitted only when it is transferred to a low level.

Since the operation of the CPU 11 is stopped until the CPU reset signal /VRES attains a high level, the write timing signal /WR would also normally be at a high level during this period. However, it is forced to the low level due to the larger driving force of the additional circuit with respect to the console equipment of the game machine 1.

Figure 10:
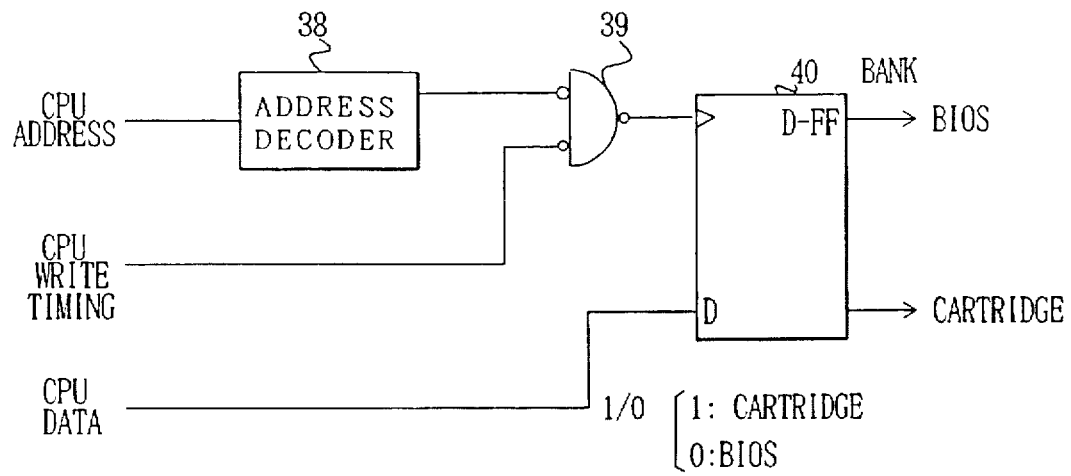
FIG. 10 is a circuit diagram of a structural example of a bank logic circuit 14 shown in FIG. 1.

FIG. 10 is a structural example of the bank logic circuit 14 shown in FIG. 1. In the circuit, "38" designates an address detection or decoder circuit, which receives address bits VA 23 through VA 1 and detects whether the address is $A14100 (that is, the bank switch command).

The output of the address detection circuit 38 and the write timing signal are inputted to a NAND gate circuit 39, which generates a trigger signal for a D flip-flop 40 to permit data from a data input terminal of the D-FF 40 to be written.

In the second embodiment shown in FIG. 7, when the bank switch command $A14100 and the bank data $0001 are given while the write timing signal /WR is low, "1" is set in the D-FF 40. This causes bank switching to the cartridge 2, as shown in FIGS. 9C through 9E.

The CPU reset signal /VRES becomes high at the time t2 [see FIG. 9B], so that the CPU is reset. This corresponds to the CPU reset state (STEP S00) shown in the flow chart of FIG. 3. Then, since the bank switching to the cartridge 2 has been performed, as described above, it becomes possible immediately to bypass the security check routine (Y) and read the game program from the game cartridge 2 in the first embodiment [STEP S10: refer to FIG. 4].

Accordingly, it becomes possible to start a game program which does not include any security check (STEP S111).

Third Embodiment of the Present Invention

Although the security check routine (Y) in the flow chart of FIG. 3 is bypassed in the above described first and second embodiments, in the third embodiment the security check following the initializing routine (X) is controlled so that it always succeeds by operating a specified signal line at the time when the BIOS operates on a step of the initializing routine (X).

The security code "SEGA" is stored at address No. $100 of the BIOS ROM in the same form as in a genuine game cartridge 2, and provides original data for comparing the security code with the contents of a game cartridge 2.

The security check is released, if it is detected that the same "SEGA" code is stored at the address No. $100 in a game cartridge 2 during the security check routine (Y).

Accordingly, if bank switching from the BIOS ROM to the cartridge is not performed at STEP S4 in the flow chart of FIG. 3, the BIOS compares the "SEGA" code with that stored in the BIOS ROM, not with the content stored in the game cartridge 2, at STEP S5. Since the code "SEGA" is stored at address No. $100 in the BIOS ROM, a correspondence is always detected and the security check is released (STEP S7: refer to FIG. 3), thus permitting processing to proceed to the game executing routine (Z). It should be noted that a bank change is not effected in this embodiment at sub-step S60 in FIG. 3 since the bank is not switched to cartridge 2 at STEP S4 (that is, bank logic circuit 14 continues to select BIOS ROM 13 when sub-step S60 is executed), and that the game stored in cartridge 2 can be played during the game executing routine (Z) despite the absence of a bank change at STEP S4 because of the bank change to the cartridge during sub-step S62.

The third embodiment has the advantage that the additional circuit is simplified in comparison with the second embodiment. The third embodiment of the additional circuit will be explained as follows.

Figure 11:
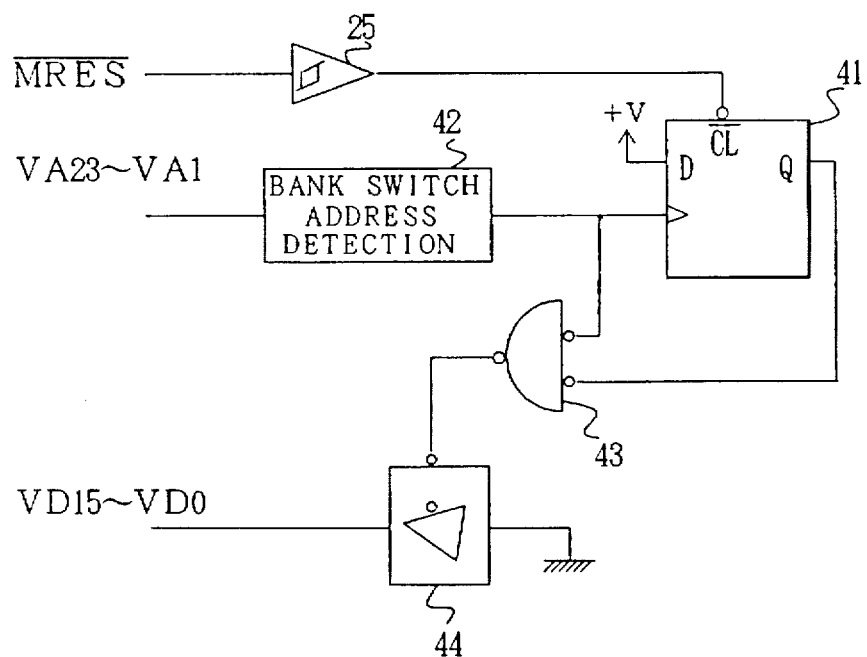
FIG. 11 is a circuit diagram showing a third embodiment applying a method according to the present invention.

FIG. 11 is a structural diagram of the circuit of the third embodiment according to the present invention. The circuit is provided in the game cartridge 2 or as an exclusive circuit, as in the above-described embodiments. FIGS. 12A through 12D represent an operational time chart corresponding to the circuit.

When the power switch of the console equipment of the game machine 1, not shown the diagram, is turned ON, a reset signal /MRES having a rising time point formed by a Schmitt trigger circuit 25 is inputted to the clear terminal /CL of a latch circuit 41. The latch circuit 41 is the same as the latch circuit 22 of FIG. 5.

The address signal VA 23 through VA 1 (representing address bits) is inputted to the bank logic circuit 14 by the CPU 11 and is also inputted to a bank switching address signal detection circuit or decoder 42 at the same time, after the reset signal /MRES becomes high.

When the address signal (VA 23 through VA 1) is inputted to the bank logic circuit 14, it is received by the address decode circuit 38 in the detailed embodiment of the bank logic circuit 14 explained above (FIG. 10). The address signal (VA 23 through VA 1) for bank switching is detected by the address decoder circuit 38 and an active low signal is inputted to one input terminal of the NAND gage 39.

At the same time, the address signal (VA 23 through VA 1) for bank switching is detected by the address signal detecting decoder 42 of the additional circuit. When decoder 42 detects the bank switch address (which is $A14100 in hexidecimal) the output of detector 42 changes from a high level to a low level. This signal is supplied to one input terminal of a gate 43 and to the trigger input terminal of latch circuit 41 (a D-type flip-flop). Latch circuit 41 is triggered on the rising edge of the signal applied to its trigger input terminal, so its Q output remains at a low level and is supplied to the other input terminal of gate 43. Then, an active low signal is inputted to one terminal of a tristate buffer 44, via the gate 43. In this case, the tristate buffer 44 outputs a logical 0 as data, since its input terminal is connected to ground. The Q output of latch circuit 41 becomes high when the address bits VA 23–VA 1 thereafter change from the bank switch address to some other address and the output of decoder 42 changes from low to high. This keeps gate 43 from actuating buffer 44 when the bank switch address appears again.

The logical 0 output from buffer 44 is sent to the data input terminal D of the bank logic circuit 14 via the bus 10 of the console equipment of the game machine 1.

A logic 1 signal and a logic 0 signal are inputted at the same time to the data input terminal D of the bank logic circuit 14, so that these logic levels collide. However, the logic 0 signal from the additional circuit is selected to be valid by making the driving power of the additional circuit larger than that of the CPU 11.

In FIG. 10, when a write signal is sent from the CPU 11 and the address decoder 38 detects the address for bank switching from the CPU 11, a trigger signal from the NAND gate 39 is inputted to the trigger terminal of D-FF 40. Unlike the latch circuit 41, the D-FF 40 is triggered on the falling edge of the signal supplied to its trigger input terminal.

Accordingly, the latch circuit D-FF 40 stores the logic 0 signal appearing at the data terminal D. In this state the D-FF 40 selects the BIOS ROM, without bank switching to the cartridge at STEP S4 of FIG. 3 [refer to FIG. 12D].

Therefore, the correspondence of the code "SEGA" is detected in the security check routine (Y) (STEP S5), so that the security check is released (STEP S7), thus starting the game.

Figure 12:
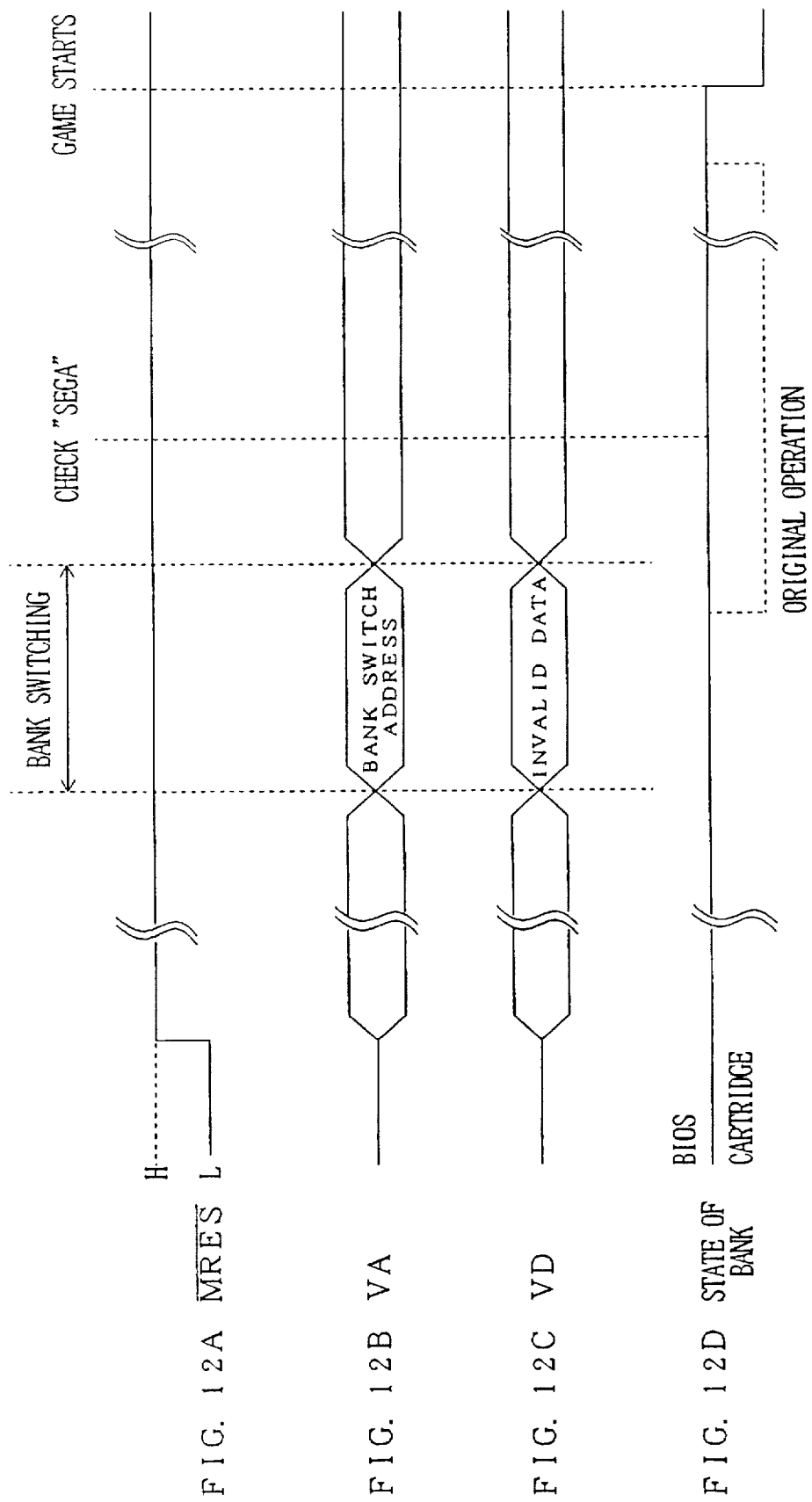
FIGS. 12A–12D represent an operational time chart of the circuit of the embodiment shown in FIG. 11.

If the method according to the present embodiment were not executed, the data from the CPU 11 would not be forcibly invalidated, and bank switching to the cartridge would be performed, as shown with the broken line in FIG. 12D. In that case, the presence or absence of the code "SEGA" in the cartridge 2 would be detected as in the original operation.

Fourth Embodiment of the Present Invention

Figure 13:
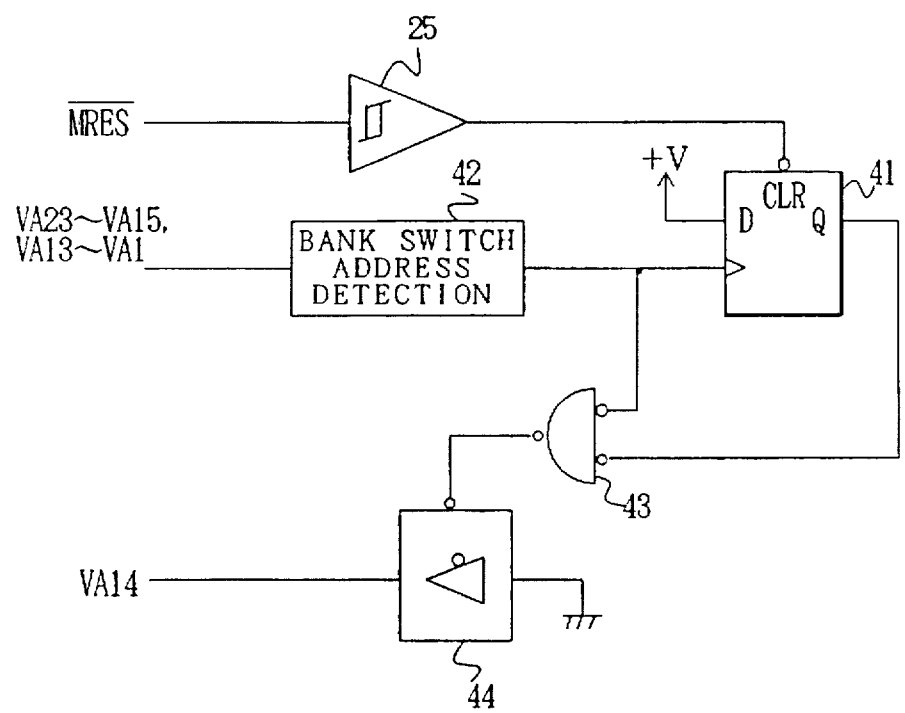
FIG. 13 is a circuit diagram showing a fourth embodiment applying a method according to the present invention.

FIG. 13 is a diagram of the circuit of the fourth embodiment of the present invention. As described above, in the third embodiment shown in FIG. 11, when the bank switch address bits VA 23 through VA 1 are emitted from the CPU 11, the bank data is made invalid and sent to the bank logic circuit 14.

In contrast, in the fourth embodiment, the bank switch address is made invalid, so that the address decoder 38 does not detect it.

When the address No. $A14100 is employed as a control address for performing the bank switching, the address bits VA 23 through VA 1 corresponding to the address $14100 are outputted from the CPU 11, and inputted to the bank switch circuit 14 via the bus 10, in order to cause bank switching to be performed.

At the same time, the address bits VA 23 through VA 1 are also sent to the bank switch address detection circuit 42 of the circuit shown in FIG. 13 via the bus. In the embodiment shown in FIG. 13, the address bits VA 23 through VA 15 and VA 13 through VA 1, excluding address bit VA 14, are inputted to the address detection circuit 42.

That is, the fourteenth address bit VA 14 of the address $A14100 (which is expressed in hexadecimal) is "1". It is noted that the hexadecimal number $A14100 is 1010 0001 0100 0001 0000 0000 in binary, and thus it would appear superficially that the fourteenth bit of $A14100 is zero, but in console equipment 1 the least significant bit VA0 does not serve as part of the address. Further, VA 14 becomes "0" in the address $A10100. Therefore, since the address bits VA 23 through VA 15 and VA 13 through VA 1 (excluding VA 14) are inputted to the address detection circuit 42, either the address $A14100 or the address $A10100 results in a detection output.

The latch circuit 41, the gate circuit 43 and the tristate buffer 44 shown in FIG. 11 are the same as in FIG. 13, and the input side of the tristate buffer 44 is connected to ground. Accordingly, the address bit VA 14 is outputted as "0" and sent to the console equipment of the game machine 1 via the bus.

On the other hand, when the CPU 11 emits the address bits VA 23 through VA 1 for the bank switch address to the bus, and the bit VA 14 given from the CPU 11 is "1". This collides with the "0" value for bit VA 14 emitted by the tristate buffer 44. However, the driving force of the tristate buffer 44 is made larger than that of the CPU 11, so that the bit VA 14 becomes "0" by force.

In this case, the bank switch address is not detected by the address decoder 38 in the bank logic circuit 14 shown in FIG. 10. Accordingly, the state of the D-FF 40 is not changed, and the bank is kept on the BIOS ROM side as it is, even if the bank data emitted by the CPU is "1" to bank switch to the cartridge side.

Therefore, just as was the case in the third embodiment shown in FIG. 11, the "SEGA" code of the BIOS ROM is compared with itself [FIG. 3: refer to STEP S5], the security check routine (Y) is released [FIG. 3: refer to STEP S7], and the game can be started.

With the above-described embodiments, it becomes possible to realize the present invention by adding simple circuitry and to use software assets effectively, without the restriction of the security check, even if, for example, different equipment is used.

Further, there is no need to include the security check code and the like in software which is distributed by a distribution service, so that it becomes possible for the subscribers to receive services effectively.

Furthermore, although stress has been laid on game software while the above-described embodiments have been explained, the present invention is not limited to the use of such programs. Even if a program is stored in a CD-ROM or the like, rather than a ROM cartridge, it should be understood that the same technical concepts can be used within the protective scope of the present invention.

What is claimed is:

1. A method for executing a software program stored in an external memory, using console equipment which includes a CPU and a BIOS ROM, said method comprising the steps of:

(a) bank switching from the BIOS ROM to the external memory, to activate the external memory rather than the BIOS ROM without executing a BIOS program stored in the BIOS ROM;

(b) resetting the operation of the CPU while the external memory rather than the BIOS ROM is activated; and (c) starting to read the software program with the CPU, after the CPU has been reset.

2. The method for executing a software program according to claim 1, wherein step (b) is conducted by a hardware circuit which stops the operation of the CPU within a given period of time after power has been supplied.

3. An improved method for executing a software program stored in external storage equipment, using console equipment which includes a CPU and a BIOS ROM and which is designed to execute an initializing routine, a security check routine for checking the genuineness of the software program, and a program executing routine for executing the software program by the CPU if the software program is judged to be genuine during the security check routine, wherein the initializing routine includes the step of bank switching from the BIOS ROM to the external storage equipment to thereby activate the external storage equipment rather than the BIOS ROM and wherein the improved method comprises the steps of:

(a) bypassing the security check routine, at least, step (a) including the step of resetting the CPU while bank switching to the external storage equipment rather than the BIOS ROM; and (b) executing the software program by the CPU during the program executing routine after step (a) has been conducted.

4. The method for executing a software program according to claim 3, wherein the step of resetting the CPU is conducted by a hardware circuit which stops the operation of the CPU within a given period of time after power has been supplied.

5. The method for executing a software program according to claim 3, further comprising the step of down-loading the software program to the external storage equipment via a transmission channel of CATV before the security check routine.

6. An improved method for executing a software program stored in external storage equipment, using console equipment which includes a CPU and a BIOS ROM and which is designed to execute an initializing routine, a security check routine for checking the genuineness of the software program, and a program executing routine for executing the software program by the CPU if the software program is judged to be genuine during the security check routine, wherein the initializing routine includes the step of bank switching from the BIOS ROM to the external storage equipment to thereby activate the external storage equipment rather than the BIOS ROM and wherein the improved method comprises the steps of:

(a) bypassing the security check routine, at least, including the step of bank switching to the external storage equipment while the CPU is kept in a reset state; and (b) executing the software program by the CPU during the program executing routine after step (a) has been conducted.

7. The method for executing a software program according to claim 6, wherein step (a) is conducted by a hardware circuit which stops the operation of the CPU within a given period of time after power has been supplied.

8. Circuit equipment for connection to console equipment having a CPU for executing a software program, comprising:

means for generating a console equipment reset signal /MRES when power is supplied for resetting the console equipment; and means for generating a CPU reset signal /VRES for resetting the CPU, based on the console equipment reset signal /MRES and a chip enable signal /CEO from the console equipment, wherein the CPU reset signal /VRES has a predetermined digital state for a fixed interval which begins after the chip enable signal /CEO has changed to the predetermined state.

9. Circuit equipment for connection to console equipment having a CPU for executing a software program, comprising:

means for generating a CPU reset signal /VRES to keep the CPU in a reset state for a fixed interval, based on a console equipment reset signal /MRES for resetting the console equipment which is generated when power is supplied; and means for emitting a bank switch address, bank data, and a write timing signal to the console equipment while the CPU is in the reset state.

10. Circuit equipment for connection to console equipment having a BIOS ROM and a CPU for executing a software program stored in an external memory, comprising:

means for detecting a bank switch address from the CPU; and means for replacing first bank data from the CPU for activating the BIOS ROM rather than the external memory with second bank data for activating the external memory rather than the BIOS ROM, the first bank data being replaced with the second bank data by force when the bank switch address is detected by the means for detecting.

11. Circuit equipment for connection to console equipment having a CPU and a BIOS ROM for executing a software program stored in an external memory, comprising:

means for detecting a bank switch address from the CPU; and means for replacing the bank switch address from the CPU for activating the BIOS ROM with an address which is different from the bank switch address, for activating the external memory by force, when the bank switch address is detected by the means for detecting.

* * * * *